Patented Aug. 31, 1954

2,687,983

UNITED STATES PATENT OFFICE 2,687,983

CATALYTIC DESULFURIZATION OF HYDROCARBONS

William E. Garwood, Haddonfield, N. J., assignor to Socony-Vacuum Oil Company, Incorporated, a corporation of New York No Drawing. Application February 11, 1953,
Serial No. 336,437

8 Claims. (Cl. 196—28)

This invention relates to an improvement in catalytic desulfurization of hydrocarbons having an undesirably high content of sulfur. More specifically, the present invention is concerned with a method for desulfurizing a hydrocarbon in the presence of a chromia-alumina catalyst. In particular, the invention relates to a process for pretreating a chromia-alumina catalyst to decrease the amount of coke formed during the desulfurizing operation and to thereby increase the desulfurization efficiency of said catalyst.

Petroleum hydrocarbons generally contain varying amounts of sulfur compounds as impurities. Among these sulfur compounds may be mentioned hydrogen sulfide, mercaptans, alkyl sulfides, dialkyl sulfides, thiophanes and thiophenes, which are distributed in the various products obtained from crude hydrocarbon stocks according to their boiling points or to their relative volatility in hydrocarbon mixtures. Also, the particular kind and amounts of said sulfur compounds present in a petroleum hydrocarbon vary with the previous manufacturing and processing operations to which said petroleum hydrocarbon has been subjected. Thus, straight-run gasolines generally contain, for the most part, non-refractory type sulfur compounds, notably hydrogen sulfide, mercaptans, disulfides and, to a lesser extent, aliphatic sulfides, together with some refractory type sulfur compounds, including cyclic ring compounds, of which the thiophanes and thiophenes are typical examples. Some straight-run gasolines contain no refractory type sulfur compounds and, therefore, can be relatively easily desulfurized by conventional methods. Other hydrocarbon fractions, for example, cracked gasolines, generally contain appreciably greater amounts of the refractory type sulfur compounds which are more difficult to remove. Likewise, diesel fuels and gas oils ordinarily contain sulfur compounds as impurities.

All of the foregoing sulfur compounds are objectionable because of their bad odor, because they reduce the effectiveness of additives, such as tetraethyl lead, and also generally because of their corrosive tendencies. The non-refractory sulfur compounds can be altered to less objectionable form or removed by a number of conventional treating operations, such as catalytic decomposition in the vapor phase, treatment with acid, adsorption in the liquid phase with silica gel or bauxite, oxidation with doctor solution and processing with caustic tannin. Refractory sulfur compounds, however, are not removed by any of the foregoing methods. Since it is generally desirable to effect removal of substantially all sulfur from hydrocarbon fractions, considerable attention has been given in the past to certain catalytic hydrogenation procedures which are capable of removing all of the various type sulfur compounds, including refractory sulfur compounds, from petroleum hydrocarbons. Such procedures have commonly been referred to as catalytic hydrodesulfurization and include those methods in which the sulfur contained in the charge stock is removed therefrom in the form of a gas such as hydrogen sulfide by the catalytic action of a catalytic material having hydrogenating characteristics.

One of the major disadvantages encountered in catalytic dehydrosulfurization has been the excessive amount of hydrogen consumed during the operation, necessitating large facilities for the preparation and storage of hydrogen which, in turn, increases the overall expense of the process. Another equally great or greater difficulty in these processes is the diminution of catalyst activity and the shortening of catalyst life due to the deposition of carbon and sulfur-containing matter commonly referred to as "coke" upon the surface of the catalyst. Not only does this deposition cause the catalytic activity to diminish and consequently decrease the useful on-stream period but also the coke adversely affects the mechanical strength of the catalyst, tending to cause pulverization of the same and hence reducing the over-all catalyst life. The problem of hydrogen consumption is also intimately correlated with the coke deposition in that large amounts of hydrogen are wasted by reacting with the coke or with the cracked charge stock due to the catalytic activity of the coke to form low boiling gaseous hydrocarbons, such as methane. Furthermore, due to the decrease in catalyst activity and increase in coke deposition, large reactors and regenerators must be used to achieve commercial practicality.

The choice of catalyst is an important factor influencing the course and extent of desulfurization. Thus, one typical hydrogenation process is that wherein molybdena deposited on alumina gel is used as a catalyst. This process will effect removal of refractory-type sulfur. However, the catalyst of molybdena on alumina gel rapidly loses activity in so far as its desulfurizing ability is concerned. The relatively large amount of coke deposited on the catalyst decreases the on-stream efficiency and makes regeneration difficult. In addition, the regeneration is further complicated by the fact that large amounts of additional heat are liberated when the molybdenum is oxidized from reduced form to MoO₃. Furthermore, the molybdena-alumina gel catalyst employed is inherently characterized by a physical weakness which leads to breakup and formation of undesirable fines when used in a moving-bed reactor system. During reaction with such catalyst, sulfur is removed by direct combination with molybdenum to form the sulfide. In the regeneration step, this sulfur is removed as SO₂, which creates a health hazard if released into the air in too great a concentration.

Other well-known hydrogenation catalysts are chromium and nickel. A catalyst of nickel on a support such as kieselguhr may be used but its commercial utilization is severely limited since its desulfurization ability rapidly depreciates with use. Chromia deposited on porous supporting materials, such as activated alumina and bauxite, has been used as a desulfurization catalyst. Such catalysts lose activity on continued usage and break up upon regeneration due to thermal stresses developed therein. In addition, they have a poor resistance toward attrition and accordingly are not practical for use in continuous commercial operations such as those employing a moving bed type unit.

It is a major object of the present invention to provide an improved hydrodesulfurization process without encountering the difficulties inherent in the aforementioned prior art procedures. A still further object is the development of a desulfurization method for treating sulfur-containing hydrocarbons utilizing a catalyst capable of maintaining its desulfurizing ability upon aging. A still further object of this invention is to provide a hydrodesulfurization process in which the coke deposition on the surface of the catalyst is materially reduced. A very important object is the provision of a method for catalytic hydrodesulfurization which is capable of continuous commercial operation.

The above and other objects which will be apparent to those skilled in the art are achieved in accordance with the present invention. Broadly, the process described herein involves hydrodesulfurization of hydrocarbon fractions containing sulfur either in the refractory or non-refractory form by contacting with a cogelled chromia-alumina catalyst which has undergone pretreatment with hydrogen and hydrogen sulfide at elevated temperatures.

It has been discovered, in accordance with the present invention, that chromia-alumina cogelled composites which have been subjected to pretreatment with hydrogen and hydrogen sulfide, under conditions hereinafter set forth, possess improved catalyst life, lead to a reduction in coke formation and overcome disadvantages inherent with the use of previously employed catalysts for hydrodesulfurization. The catalyst used in the instant process is a chromia-alumina gel containing a major proportion of aluminum oxide and a minor proportion of chromium oxide. Generally, the catalyst contains a chromium oxide content in the range of 20 to 40 weight per cent and an alumina content in the range of 60 to 80 weight per cent. A particularly preferred composition for use under the reaction conditions hereinafter set forth is one containing approximately 30 to 35 weight per cent chromic oxide and approximately 65 to 70 weight per cent aluminum oxide. It is contemplated that the above catalysts may be prepared by any appropriate procedure known in the art.

A preferred method of preparation, however, is that described in the copending application of Stover and Wilson, Serial No. 201,537, filed December 14, 1950. The procedure described therein, involving reaction of chromic acetate and sodium aluminate under defined conditions is particularly valuable in manufacture of the catalyst in the form of hard, glassy bead-like spheroids. A preferred embodiment of the present invention is the use of the catalyst in the form of spherical particles since it is thereby rendered more resistant to abrasion and hence particularly well adapted to moving bed-type systems wherein the catalyst moves in a closed path including a reactor and a regenerator. Such bead-form gel catalyst is advantageously prepared in equipment of the type described in U. S. 2,446,783 to Payne.

According to this invention, it has been found that a hydrocarbon containing an organic sulfur compound can be efficiently desulfurized by contacting it at an elevated temperature with a chromia-alumina cogelled catalyst which has undergone pretreatment by reduction with hydrogen and sulfiding with hydrogen sulfide. The extent of coke formation employing such catalyst is much less than that incurred using a catalyst which has not been pretreated. Thus, in accordance with the invention, a hydrocarbon which is to be desulfurized is contacted at an elevated temperature with a chromia-alumina cogelled composite which has undergone a preliminary treatment with hydrogen and hydrogen sulfide, whereby the overall efficiency of the catalyst is greatly improved in effectively removing sulfur with considerably less coke formation than is obtained using the untreated catalyst.

It is thus an important feature of the present invention that the catalytic desulfurization efficiency of a chromia-alumina cogelled catalyst can be greatly increased with regard to the extent of coke formation by subjecting the catalyst to a preliminary treatment involving: first, reduction with hydrogen, followed by sulfiding with hydrogen sulfide. When employing such a pretreated catalyst, the amount of coke formation for the same hydrodesulfurization activity will generally be less than 50 per cent of the amount of coke formed with a non-pretreated catalyst. Sulfiding of the chromia-alumina catalyst without first reducing with hydrogen does not, as shown hereinafter, afford the desired reduction in coke make. In pretreating the catalyst of this invention, hydrogen is first contacted at an elevated temperature with the catalyst to be pretreated for a period of time sufficient to effect at least partial reduction of the oxides comprising the catalyst. The reduced catalyst is thereafter sulfided by treating with hydrogen sulfide. The particular conditions employed for pretreatment will depend on the concentration of sulfur compounds in the hydrocarbon to be desulfurized. Generally, the pretreatment conditions involve the use of an elevated temperature within the range of 500° F. to 1300° F. and, more particularly, between about 750° F. and about 1100° F. The time of each pretreating step may vary over a wide range, generally being between about 0.5 and about 72 hours and preferably between about 5 and about 20 hours. The amount of hydrogen employed in the initial pretreating step is generally between about 0.02 and about 8 grams per cubic centimeter of catalyst. The amount of hydrogen sulfide employed for pretreatment is generally between about 0.1 and about 2.0 grams per cubic centimeter of catalyst. The pretreating operation is carried out at substantially atmospheric pressure but pressures up to 20 atmospheres may be employed with advantage. It is essential that the catalyst undergo reduction with hydrogen before sulfiding with hydrogen sulfide. This sequence of first reducing and then sulfiding is generally carried out by initially contacting the catalyst with hydrogen and thereafter contacting the reduced catalyst with hydrogen sulfide. However, it is within the purview of this invention to subject the catalyst to a preliminary combination reduction-sulfiding step by bringing the catalyst into contact with a stream containing both hydrogen and hydrogen sulfide. Under such conditions, control of the temperature during the preliminary treatment is necessary. For example, at the outset the upper range of the temperature limit is employed which would favor the hydrogen reduction reaction, i. e. temperatures in the approximate range of 900° F. to 1300° F. After sufficient reduction is attained, the temperature is reduced to a lower range which favors the sulfiding reaction, i. e., temperatures between about 500° F. and about 900° F. In addition to the use of hydrogen and hydrogen sulfide as preliminary treating gases, the reduction step could be made with any hydrogen-rich gas and the sulfiding step could be accomplished using a gaseous stream rich in hydrogen sulfide. Where the pretreatment is carried out with a gaseous mixture containing both hydrogen and hydrogen sulfide, the weight ratio of hydrogen to hydrogen sulfide in such mixture should be within the range of 1:1 to 4:1. A third pretreating step may consist of another hydrogen purge carried out for at least a time sufficient to increase the desulfurization activity of the catalyst. The amount of hydrogen used in such step should be less than that in the first step and generally between about 0.002 and about 0.02 gram per cubic centimeter.

After subjecting the catalyst to the above-described pretreatment, the same may be used for desulfurizing hydrocarbons containing organic sulfur compounds. The hydrocarbons to be desulfurized include petroleum fractions such as gasolines and gas oils, as well as reduced crudes and whole crudes high in sulfur. Also, such light hydrocarbons as butane, pentane, hexane, etc., may be desulfurized using the present catalyst. When the hydrocarbon or hydrocarbon mixture to be treated is normally liquid, it is preferable, although not essential, to treat such hydrocarbon or hydrocarbon mixture in the vapor phase.

The temperature employed in the desulfurization process depends on the particular hydrocarbon being desulfurized, the time of contact of the catalyst, and the hydrocarbon charge, the sulfur content of the charge stock, and the particular pressure employed. Generally, a temperature between about 500° F. and about 1300° F., preferably between about 700° F. and about 1100° F. and, still more preferably, between 750° F. and 1000° F., is employed. The pressure during the desulfurization operation may range from 1 to 100 atmospheres and preferably from 10 to 30 atmospheres.

The amount of hydrogen employed will depend upon the nature of the hydrocarbons undergoing treatment and particularly upon the form of combination of the sulfur. Refractory sulfur compounds in which the sulfur atom is a member of a heterocyclic ring are the most difficult to decompose and larger quantities of hydrogen will be necessary when the hydrocarbon stocks contain a high content of such compounds. Under usual conditions, hydrogen in the amount of 0.1 to 10, and preferably 0.5 to 4, moles per mole of hydrocarbon affords satisfactory desulfurization. The space velocity of the hydrocarbon charge contacting the catalyst is such as to secure adequate contact time therewith. Generally, the space velocity is within the approximate range of 0.1 to 20 liquid volumes of hydrocarbon per volume of catalyst per hour and preferably from about 0.5 to about 5 volumes per volume of catalyst per hour. Hydrocarbon stocks containing large amounts of sulfur compounds generally require longer periods of contact with the catalyst than those containing only small amounts of sulfur compounds. The space velocity also depends to some extent on the temperature employed, being higher for high temperatures than it is for low temperatures.

The particular conditions under which desulfurization is effected using a catalyst of the invention will depend on the stock undergoing desulfurization, and the optimum conditions in any instance can be readily determined by routine test. After the catalyst has been in use for an extended period of time, the activity decreases as a result of coke deposition on the surface thereof. The catalyst is then reactivated by contacting with an oxygen-containing gas at an elevated temperature to burn off the coke. Regeneration is then preferably followed by the preliminary treatment of the catalyst with hydrogen and hydrogen sulfide as described above before bringing the regenerated catalyst into contact with the charge stock.

With the use of the pretreated chromia-alumina cogelled catalyst for desulfurization in accordance with the instant invention, a distinctly lower coke make is obtained than with a non-pretreated catalyst. The lowered coke make results in several advantages. A longer on-stream time in a static bed hydrodesulfurization unit than that obtainable with untreated chromia-alumina catalyst is made possible. In a moving bed unit, a higher oil to catalyst ratio is possible since the maximum coke which can be tolerated on the catalyst is limited by the kiln capacity of the regeneration unit. For a given size unit, smaller coke burning facilities are required using the pretreated chromia-alumina catalyst. In addition, the catalyst life is longer due to the fewer regeneration steps necessary.

The following comparative examples will serve to illustrate the improvement in hydrodesulfurization attained using the above-described pretreated chromia-alumina catalyst. In these examples, hydrodesulfurization of a gas oil charge having a specific gravity of 0.8353, a bromine number of 23, a volume per cent aromatics of 24, and a sulfur content of 1.28 per cent was contacted with the oxidized, reduced, and sulfided forms of chromia-alumina cogelled catalyst.

The procedure used involved charging 300 cc. of chromia-alumina cogelled spheroidal particles consisting of 32 weight per cent $Cr_2O_3$, 65 weight per cent $Al_2O_3$, and 3 weight per cent water, or 300 cc. of this catalyst pretreated as indicated, to a 500 cc. stainless steel reactor. The reactor was inserted in a salt bath at 800° F. and connected to a stainless steel preheater and condensing system. The entire system was then pressured to 500 pounds per square inch gauge with hydrogen. The hydrogen rate was adjusted to 0.06 cubic feet per minute and the gas oil charge stock was pumped in at the rate of 5 cc. per minute. The reaction conditions were thus:

| | |
|---|---|
| Temperature, °F. | 800 |
| Pressure p. s. i. g. | 500 |
| Hydrogen/Oil molar ratio | 4 |
| Space velocity | 1 |

The run was continued for 3 hours after the first liquid product appeared at the end of the condensing system. Analyses were obtained on the liquid product, gaseous product, and used catalyst. The results of hydrodesulfurization using the oxidized, reduced, and sulfided chromia-alumina catalyst are set forth in the table below:

*Table 1*

| Example No. | 1 | 2 | 3 | 4 | 5 |
|---|---|---|---|---|---|
| Catalyst (300 cc.): | | | | | |
| Reduced with H₂ (Atmospheric pressure). | No | Yes | Yes | Yes | No |
| Temp., °F | | 800 | 880 | 800 | |
| H₂ (cubic feet) | | 70 | 50 | 50 | |
| Time, Hrs. (Approx.) | | 16 | 16 | 5 | |
| Sulfided with H₂S (Atmospheric pressure). | No | No | Yes | Yes | Yes. |
| Temp., °F | | | 770 | 800 | 800. |
| H₂S Used (g.) | | | 180 | 180 | 180. |
| Time, Hrs. (Approx.) | | | 72 | 16 | 16. |
| Catalyst, Percent S | 0.0 | 0.0 | 0.58 | 1.70 | 1.25. |
| Grams of Catalyst Charged to Run | 272 | 292 | 299 | 294 | 318. |
| Reaction Temp., °F | 800 | 800 | 800 | 800 | 800. |
| Oil In, cc | 1,178 | 1,158 | 1,120 | 1,095 | 1,195. |
| Liquid Product: | | | | | |
| Volume (cc) | 1,170 | 1,140 | 1,100 | 1,075 | 1,145. |
| Vol. Percent Recovery | 100.0 | 99.5 | 99.0 | 99.0 | 97.0. |
| Specific Gravity | | 0.8123 | 0.8217 | 0.8189 | 0.8198. |
| Bromine No. | | 11.1 | 8.1 | 5.9 | 6.9. |
| Vol. Percent Aromatics | | 22 | 21 | 22 | 20. |
| Percent Sulfur | 0.36 | 0.26 | 0.39 | 0.37 | 0.58. |
| Used Catalyst: | | | | | |
| Grams of used catalyst | 278 | 299 | 302 | 296 | 323. |
| Percent Sulfur | 0.77 | 0.86 | | 1.00 | 0.46. |
| Percent Carbon | 2.46 | | | | |
| Percent Coke | 3.28 | 2.98 | Approx. 1 | 1.39 | 2.83. |
| Wt. Percent of Charge to Carbon | 0.69 | 0.65 | | 0.12 | 0.76. |
| Wt. Percent of Charge to Coke | 0.92 | 0.92 | Approx. 0.3 | 0.45 | 0.91. |

It will be noted from the above data that pretreatment of the chromia-alumina catalyst with hydrogen alone made the catalyst more active, as indicated by the lower sulfur content of the refined oil while not affecting the coke make. Pretreatment with hydrogen sulfide alone also did not affect the coke make but deactivated the catalyst, as indicated by the higher sulfur content of the refined oil. A combination pretreatment, however, consisting of, first, hydrogen and then hydrogen sulfide, decreased the coke make appreciably without affecting the desulfurization activity of the catalyst.

In accordance with this invention, a cogelled chromia-alumina catalyst which has undergone initial pretreatment with hydrogen, followed by treatment with hydrogen sulfide, when used in hydrodesulfurization, results in a considerably reduced coke formation with undiminished desulfurization activity as compared with a chromia-alumina catalyst which has not undergone a preliminary treatment. The effects of the preliminary treatment, in so far as coke reduction is concerned, appears to be a function of the chromia-alumina catalyst since other well-known hydrodesulfurization catalysts, such as nickel supported on kieselguhr and molybdena deposited on alumina gel, when subjected to the preliminary treatment of this invention, did not give a reduction in coke formation but, on the contrary, the amount of coke formed with such catalysts was in excess of that obtained with the untreated catalyst.

It is, accordingly, to be understood that the above description is merely illustrative of preferred embodiments of the invention, of which many variations may be made within the scope of the following claims by those skilled in the art without departing from the spirit thereof.

I claim:

1. In a catalytic hydrodesulfurization process wherein a charge of sulfur-containing hydrocarbon is contacted with a cogelled chromia-alumina catalyst, the improvement which comprises pretreating said catalyst by contacting the same at elevated temperature with between about 0.02 and about 8 grams of hydrogen per cubic centimeter of catalyst, thereafter sulfiding the catalyst with between about 0.1 and about 2 grams of hydrogen sulfide per cubic centimeter of catalyst and subsequently contacting the catalyst so pretreated with said hydrocarbon to be desulfurized.

2. In a catalytic hydrodesulfurization process wherein a charge of sulfur-containing hydrocarbon is contacted with a catalyst consisting essentially of about 20 to about 40 weight per cent chromia and about 60 to about 80 weight per cent alumina, the improvement which comprises pretreating said catalyst by contacting the same at a temperature between about 500° F. and about 1300° F. with between about 0.02 and about 8 grams of hydrogen per cubic centimeter of catalyst, thereafter sulfiding the catalyst maintained at the aforesaid temperature with between about 0.1 and about 2 grams of hydrogen sulfide per cubic centimeter of catalyst and subsequently contacting the pretreated catalyst with said hydrocarbon to be desulfurized.

3. In a catalytic hydrodesulfurization process wherein a charge of sulfur-containing hydrocarbon is contacted with a cogelled catalyst consisting essentially of about 20 to about 40 weight per cent chromia and about 60 to about 80 weight per cent alumina, the improvement which comprises pretreating said catalyst at a temperature between about 750° F. and about 1100° F. over a period of from about 0.5 to about 72 hours with between about 0.02 and about 8 grams of hydrogen and about 0.1 and about 2 grams of hydrogen sulfide per cubic centimeter of catalyst and subsequently contacting the pretreated catalyst with said hydrocarbon to be desulfurized.

4. In a catalytic hydrodesulfurization process wherein a charge of sulfur-containing hydrocarbon is contacted with a catalyst consisting essentially of 30 to 35 weight per cent chromia and 65 to 70 weight per cent alumina, the improvement which comprises pretreating said catalyst by contacting the same at a temperature between about 500° F. and about 1300° F. with between about 0.02 and about 8 grams of hydrogen per cubic centimeter of catalyst, thereafter sulfiding the catalyst maintained at the aforesaid temperature with between about 0.1 and about 2 grams of hydrogen sulfide per cubic centimeter of catalyst and subsequently contacting the pretreated catalyst with said hydrocarbon to be desulfurized.

5. In a catalytic hydrodesulfurization process wherein a charge of sulfur-containing hydrocarbon is contacted with a cogelled catalyst consisting essentially of a major proportion of alumina and a minor proportion of chromia, the improvement which comprises pretreating said catalyst by contacting the same at a temperature between about 750° F. and about 1100° F. with between about 0.02 and about 8 grams of hydrogen per cubic centimeter of catalyst, thereafter sulfiding the catalyt at the aforesaid temperature with between about 0.1 and about 2 grams of hydrogen sulfide per cubic centimeter of catalyst and subsequently contacting the pretreated catalyst with said hydrocarbon to be desulfurized.

6. In a catalytic hydrodesulfurization process wherein a charge of sulfur-containing hydrocarbon is contacted with a catalyst consisting essentially of about 20 to about 40 weight per cent chromia and about 60 to about 80 weight per cent alumina, the improvement which comprises pretreating said catalyst by contacting the same at a temperature between about 500° F. and about 1300° F. over a period of from about 5 to about 20 hours with between about 0.02 and about 8 grams of hydrogen and about 0.1 and about 2 grams of hydrogen sulfide per cubic centimeter of catalyst and subsequently contacting the pretreated catalyst with said hydrocarbon to be desulfurized.

7. In a catalytic hydrodesulfurization process wherein a charge of sulfur-containing hydrocarbon is contacted with a catalyst consisting essentially of a major proportion of alumina and a minor proportion of chromia, the improvement which comprises pretreating said catalyst by contacting the same at a temperature between about 500° F. and about 1300° F. with between about 0.02 and about 8 grams of hydrogen per cubic centimeter of catalyst, thereafter sulfiding the catalyst at the aforesaid temperature with between about 0.1 and about 2 grams of hydrogen sulfide per cubic centimeter of catalyst, contacting the sulfided catalyst at said temperature with between about 0.002 and about 0.02 gram of hydrogen per cubic centimeter of catalyst and subsequently contacting the pretreated catalyst with said hydrocarbon to be desulfurized.

8. In a catalytic hydrodesulfurization process wherein a charge of sulfur-containing hydrocarbon is contacted with spheroidal gel particles consisting essentially of about 20 to about 40 weight per cent chromia and about 60 to about 80 weight per cent alumina, the improvement which comprises pretreating said catalyst by contacting the same at a temperature between about 500° F. and about 1300° F. with between about 0.02 and about 8 grams of hydrogen per cubic centimeter of catalyst, thereafter sulfiding the catalyst at the aforesaid temperature with between about 0.1 and about 2 grams of hydrogen sulfide per cubic centimeter of catalyst and subsequently contacting the pretreated catalyst with said hydrocarbon to be desulfurized.

References Cited in the file of this patent

UNITED STATES PATENTS

| Number | Name | Date |
| --- | --- | --- |
| 2,512,570 | Sartor | June 20, 1950 |
| 2,620,362 | Stiles | Dec. 2, 1952 |
| 2,623,007 | Myers | Dec. 23, 1952 |